United States Patent [19]

Margerum et al.

[11] Patent Number: 5,099,343
[45] Date of Patent: Mar. 24, 1992

[54] EDGE-ILLUMINATED LIQUID CRYSTAL DISPLAY DEVICES

[75] Inventors: J. David Margerum, Woodland Hills; Anna M. Lackner, Los Angeles; Paul J. Seiler, Thousand Oaks, all of Calif.

[73] Assignee: Hughes Aircraft Company, Los Angeles, Calif.

[21] Appl. No.: 357,510

[22] Filed: May 25, 1989

[51] Int. Cl.$^5$ .............................................. G02F 1/13
[52] U.S. Cl. ...................................... 359/48; 359/63; 359/69; 359/70; 362/27; 362/31; 362/84
[58] Field of Search ............ 350/345, 338, 337, 339 D, 350/334; 362/27, 31, 84, 26

[56] References Cited

U.S. PATENT DOCUMENTS

| | | | |
|---|---|---|---|
| 3,881,809 | 5/1975 | Fergason et al. | 350/345 |
| 4,165,930 | 8/1979 | Matsumoto | 354/466 |
| 4,642,736 | 2/1987 | Matsuzawa et al. | 362/31 |
| 4,688,900 | 8/1987 | Doane et al. | 350/347 V |
| 4,728,547 | 3/1988 | Vaz et al. | 428/1 |
| 4,811,507 | 3/1989 | Blanchet | 362/31 |
| 4,838,661 | 6/1989 | McKee et al. | 350/345 |
| 4,892,369 | 1/1990 | Moss | 340/468 |
| 4,915,478 | 4/1990 | Lenko et al. | 350/345 |
| 4,989,956 | 2/1991 | Wu et al. | 350/345 |

FOREIGN PATENT DOCUMENTS

| | | | |
|---|---|---|---|
| 3130937 | 2/1983 | Fed. Rep. of Germany | 350/338 |
| 59-222818 | 12/1984 | Japan | 350/337 |
| 60-147720 | 8/1985 | Japan | 350/338 |
| 62-17730 | 1/1987 | Japan | 350/345 |
| 62-299902 | 12/1987 | Japan | 350/345 |
| 63-110423 | 5/1988 | Japan | 350/338 |
| 63-309918 | 12/1988 | Japan | 350/338 |
| 2161309 | 1/1986 | United Kingdom | 350/345 |

OTHER PUBLICATIONS

Whitehead, Joe B., Jr., "Light Transmission and Scattering of Polymer Dispersed Liquid Crystals", SPIE, vol. 1080, Liquid Crystal Chemistry, Physics, and Applications (1989) Jan. 1989.
G. Baur et al., "Fluorescence-activated Liquid-crystal Display", Applied Physics Letters, vol. 31, No. 1, Jul. 1, 1977, pp. 4–6.
S. Sato et al., "Multicolor Fluorescent Display by Scattering States in Liquid Crystals", J. Appl. Phys. 52(6), 1981, pp. 3941–3948.
A. Goetzberger et al., "Solar Energy Conversion with Fluorescent Collectors", Applied Physics 14, 1977, pp. 123–139.
The Following Documents are Marketing Documents Distributed by Mobay Corporation: "A Little Light Goes a Long Way with Lisa"; Light-Collecting Plastics-A Brilliant Idea; Provisional Information Sheet; and Razzle-Dazzle Plastic, Steven Ashley, Popular Science, pp. 100–101.
H. Ringsdorf, et al., "Miscibility Studies of Polymeric and Low Molecular Weight Liquid Crystals and Their Behavior in an Electric Field," Makromol. Chem., Rapid Commun. 3, 745–751 (1982).
T. Kallard, "Liquid Crystals and Their Applications", Optosonic Press, New York, NY, 1970.
A. M. Lackner et al., "Contrast Measurements for Polymer Dispersed Liquid Crystal Displays", SPIE vol. 958 Automotive Displays and Industrial Illumination, (1988), pp. 73–79.
J. L. Fergason, "Polymer Encapsulated Nematic Liquid Crystals for Display and Light Control Applications", SID 85 Digest, pp. 68–70.
Electronic Engineering, vol. 46, No. 555, May 1974, p. 17, "The Illumination of Liquid Crystal Displays".
IBM Technical Disclosure Bulletin, vol. 21, No. 11, Apr. 1979, New York, pp. 4724–4726, "Optically Illuminating and Electrically and Thermally Addressing a Liquid Crystal Display", A. Aviram et al.
Molecular Crystals and Liquid Crystals Bulletin, vol. 165, Dec. 1988, New York, pp. 511–532, "Polymer Dispersed Liquid Crystals for Display Application", J. W. Doane et al.

*Primary Examiner*—Rolf Hille
*Assistant Examiner*—Minhloan Tran
*Attorney, Agent, or Firm*—V. D. Duraiswamy; W. K. Denson-Low

[57] ABSTRACT

A high contrast display is provided by illuminating a polymer dispersed liquid crystal (PDLC) display panel through opposite edges thereof. Light is scattered out the front of the panel from non-activated areas of the PDLC in which the refractive indices of the liquid crystal and polymer matrix materials are mismatched. For a direct view transmission mode display, the rear of the panel is blackened so that activated areas of the PDLC in which the refractive indices of the materials are matched transmit edge-illuminated and ambient light and appear black. For a reflection mode display usable in combination with projection optics, the rear of the panel is provided with a mirror surface, and ambient light is prevented from reaching the panel.

9 Claims, 4 Drawing Sheets

EDGE-ILLUMINATED LIQUID CRYSTAL DISPLAY DEVICES

BACKGROUND OF THE INVENTION

1. Field of the Invention

The present invention generally relates to the field of electro-optical liquid crystal devices, and more particularly to a high contrast liquid crystal display panel.

2. Description of the Related Art

Liquid crystal displays are widely used in industrial, consumer, aerospace, and other applications. Such devices generally include a liquid material which exhibits bire-fringence and dielectric anisotropy, and whose alignment direction is switchable in response to an applied electric field. Of particular interest are liquid crystal materials which are switchable between light scattering and transparent states with an applied electric field.

Polymer dispersed liquid crystal display (PDLC) cells such as disclosed in U.S. Pat. No. 4,688,900, entitled "LIGHT MODULATING MATERIAL COMPRISING A LIQUID CRYSTAL DISPERSION IN A PLASTIC MATRIX", issued Aug. 25, 1987, to Doane et al, and U.S. Pat. No. 4,728,547, entitled "LIQUID CRYSTAL DROPLETS DISPERSED IN THIN FILMS OF UV-CURABLE POLYMERS", issued Mar. 1, 1988, to Vaz et al, have been recently developed. These cells include droplets of a liquid crystal material dispersed in a light transmitting matrix in the form of a flexible plastic sheet or film, such as an ultraviolet cured epoxy or thiol-ene monomer. The liquid crystal directors in the droplets are randomly oriented in the absence of an applied electric field, whereby the index of refraction of the droplets varies locally and the droplets scatter light incident thereon from any angle. Application of a sufficiently high electric field by means of indium tin oxide (ITO) film electrodes or other appropriate means causes alignment of the liquid crystal directors parallel to the applied field when the liquid crystal has a positive dielectric anisotropy. The materials are selected such that the index of refraction of the liquid crystal material in the field-aligned state is equal to the index of refraction of the isotropic plastic matrix material for light at normal (perpendicular) incidence to the PDLC cell. Therefore, the cell appears optically transparent in the presence of an applied electric field when it is viewed at normal incidence.

A display panel is constructed by providing a liquid crystal cell having segments or other picture elements which can be collectively or individually switched on and off to form a desired pattern. Applications of liquid crystal devices cover a wide range from small consumer timepieces to relatively large dashboard and heads-up displays for automotive and other vehicle control panels.

A major problem which has persisted in many liquid crystal displays is low optical contrast between bright and dark image areas. Especially in the presence of sunlight and other high ambient light levels, conventional liquid crystal displays appear washed-out and are difficult or impossible to read.

Liquid crystal displays are conventionally illuminated from the back in a transmission mode or from the front in a reflection mode. A general description of these standard modes of operation is found in "Liquid Crystals and Their Applications", by T. Kallard, Optosonic Press, New York, N.Y., 1970. In PDLC cells, most of the light is forward scattered in a relatively small angle cone. When viewing just the scattered light from rear-illuminated PDLC cells, it has been shown, as described in a paper by A. M. Lackner, et al, Proc. SPIE Vol 958, Automotive Displays and Industrial Illumination, p.73-79, 1988, that the maximum contrast ratio is exhibited when the illumination light was about 30° off normal incidence. Illumination of a PDLC cell through an edge thereof, which is perpendicular to the orientation of the liquid crystal directors in the field aligned state, would have been expected to produce a display with both on and off segments appearing bright due to scattering by the liquid crystal droplets.

SUMMARY OF THE INVENTION

It is a purpose of the present invention to substantially increase the contrast in a liquid crystal display panel, which preferably includes a PDLC device.

It is a related goal of the invention to extend the range of application of liquid crystal display panels to include operation in sunlight and other high ambient light conditions as well as in the absence of ambient light, which has previously precluded the use of such displays. Another related goal is to extend the application of PDLC panels to include usage as light pipe devices and illumination panel devices, in which the intensity of light passing from edge to edge through the panel and emitted from the faces of the panel is controlled by an electrical field applied to the PDLC film.

The present invention uses edge illumination of a PDLC cell. In the present edge-illuminated display, in contrast to what would be normally expected, the amount of scattering in the field-aligned or on-segments is low, and the on-segments appear substantially transparent. The off-segments, however, scatter light in the normal manner, and appear bright. A black surface provided behind the panel absorbs ambient light, and consequently, the on-segments appear black. It has been determined experimentally that the contrast between bright and black segments in an edge-illuminated, black-background PDLC display is greater in bright ambient light than the contrast obtainable with conventional back-illumination. Bright ambient light does not wash out and render the display unreadable as with conventional back-illuminated liquid crystal displays. Instead, bright light (such as direct sunlight) increases the brightness of this PDLC display without substantially decreasing the contrast ratio, and thereby the readability of the display is increased. Alternatively, the present edge-illuminated display can be operated in a reflection or display image source mode, with a reflective mirror surface being substituted in place of the black rear surface, in combination with projection optics and means for preventing ambient light from reaching the liquid crystal display.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
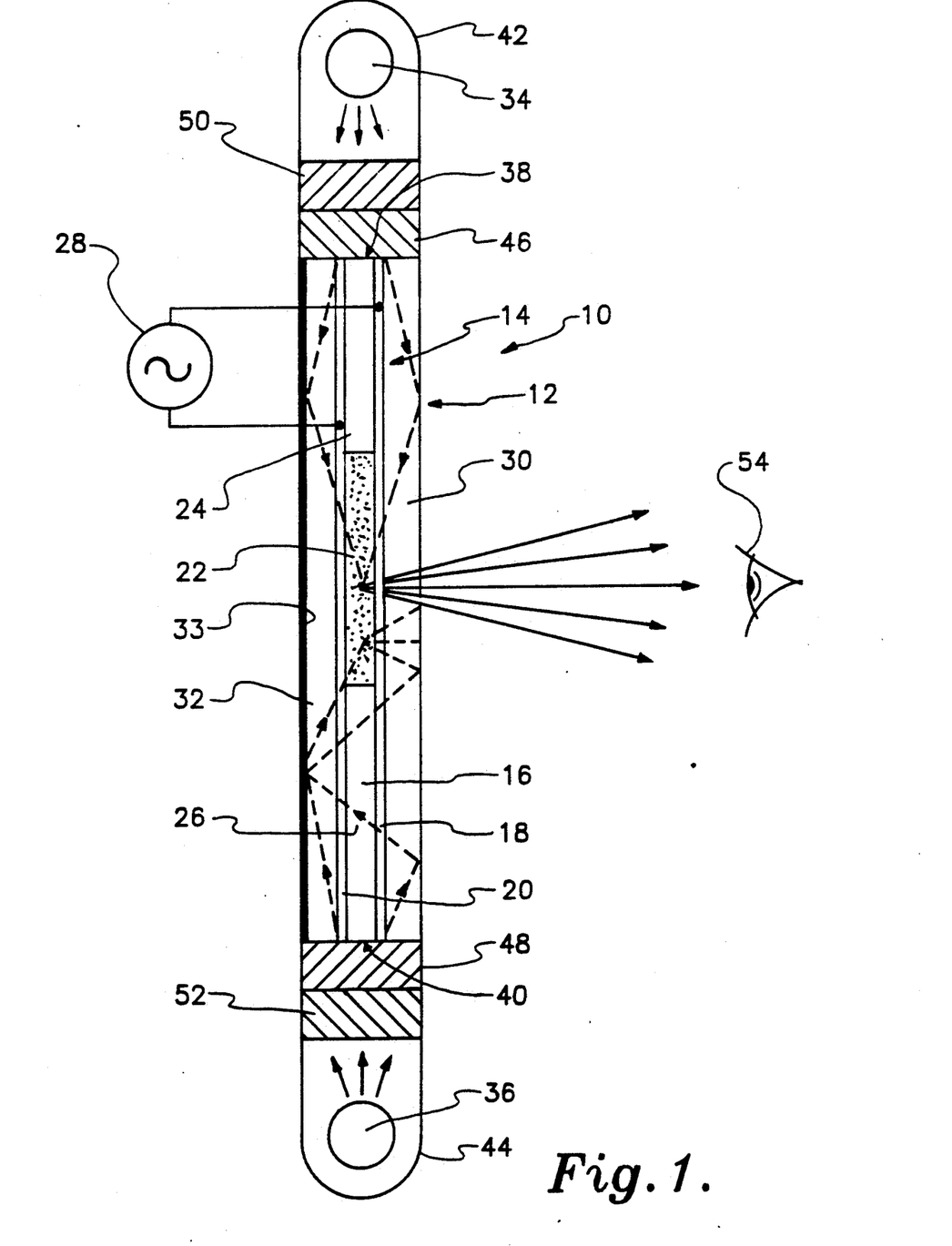
FIG. 1 is a diagram illustrating an edge-illuminated liquid crystal device of the present invention configured to operate in a transmission mode.

Referring now to FIG. 1 of the drawing, a liquid crystal display device embodying the present invention is generally designated as 10 and includes a display panel 12 having a polymer dispersed liquid crystal (PDLC) display cell 14. The cell 14 includes a PDLC film 16 which may be produced by the process described in the above-referenced patents U.S. Pat. Nos. 4,688,900 and 4,728,547 or any other suitable process. The cell 14 further has electrode layers 18 and 20 formed of, for example, indium tin oxide (ITO), on the opposite surfaces of the film 16. The cell 14 is schematically illustrated as having an off-segment 22 and on-segments 24 and 26. No electric field is applied across the cell 14 in the off-segment 22, and an electric field from a voltage source 28 is applied across the cell 14 by means of the electrode layers 18 and 20 in the on-segments 24 and 26.

The display panel 12 further includes front and back transparent face plates 30 and 32 respectively which sandwich the liquid crystal cell 14 therebetween. The face plates 30 and 32 may be formed of glass, plastic, plexiglass, or any other suitable material, with the thicknesses thereof selected to produce optimal results.

The embodiment of the invention illustrated in FIG. 1 is designed to operate in a transmission, or direct-view mode, and includes a light absorbing material 33 provided behind the back face plate 32. The material 33 may be black paint applied to the surface of the face plate 32, or a separate black sheet or plate which is maintained in contact with the plate 32 or spaced at a slight distance behind the plate 32.

Optical lamps 34 and 36 are provided to illuminate the display panel 12 through opposite edges 38 and 40 thereof respectively. The lamps 34 and 36 may be of any suitable type, for example fluorescent lamps, which provide uniform illumination. Reflectors 42 and 44 are provided to concentrate all of the light from the lamps 34 and 36 into the respective edges 38 and 40. Diffusers 46 and 48 may be provided between the lamps 34 and 36 and the edges 38 and 40. The diffusers 46 and 48 may be formed by a translucent paint on the edges 38 and 40, by grinding the edges 38 and 40, or comprise separate translucent members which are retained in the positions shown. Further illustrated are polarizers 50 and 52 which may be provided without or in combination with the diffusers 46 and 48 to allow only a portion of the light from the lamps 34 and 36 which has a preferred polarization to illuminate display panel 12.

In operation, light from the lamps 34 and 36 propagates through the display panel 12 in the vertical direction as viewed in the drawing. In the off-segment 22, the liquid crystal directors in the liquid crystal droplets of the cell 14 are randomly aligned in the absence of an applied electric field. The index of refraction of the liquid crystal material in the off-segment 22 therefore differs locally from the index of refraction of the polymer matrix in a random manner. As a result, light from the lamps 34 and 36 is scattered by the off-segment 22 out through the front of the display device 10 toward an observer 54 as schematically illustrated by solid line arrows.

In the on-segments 24 and 26, the electric field applied by the voltage source 28 and electrode layers 18 and 20 causes the liquid crystal directors in the liquid crystal droplets of the cell 14 to be aligned with the electric field, or more specifically in the horizontal direction as viewed in FIG. 1, when the LC has a positive dielectric anistropy. The on-segments 24 and 26 are transparent to ambient light incident on the display device 10, whether incident perpendicular to the surface of the panel 12 or almost parallel or inbetween. The result is that the ambient light is absorbed by the material 33 at the rear of the panel 12, and the on-segments 24 and 26 appear black to the observer 54.

The light from the lamps 34 and 36 propagates through the panel 12 in a direction largely perpendicular to the field-aligned molecules in the on-segments 24 and 26. It would be expected that this light would be scattered by the on-segments 24 and 26 in the same manner as by the off-segment 22. However, the unexpected result provided by the present invention is that the light produced by edge-illumination of the panel 12 is scattered much less by the on-segments. The on-segments 24 and 26 not only appear black to the observer 54, but the contrast ratio of the bright off-segment 22 to the dark off-segments 24 and 26 is higher than is typically attained by conventional front or rear illumination of light scattering liquid crystal display devices. Contrast ratios as high as 20:1 have been achieved experimentally.

Figure 2:
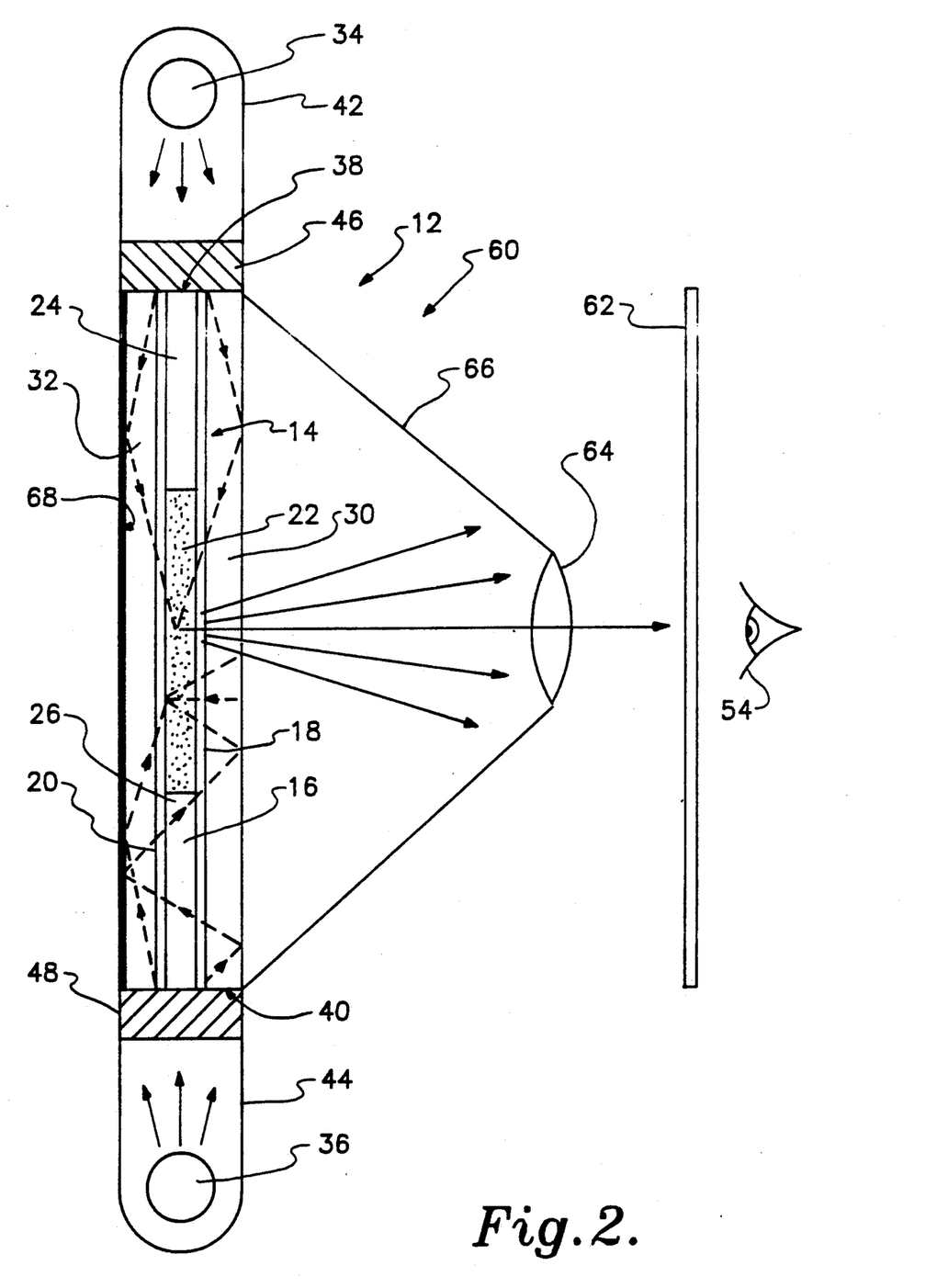
FIG. 2 illustrates the present invention configured to operate in a reflection or display image source mode.

A second liquid crystal display device 60 embodying the present invention is illustrated in FIG. 2. The device 60, unlike device 10, operates in a reflection or display image source mode.

The device 60 provides a source of an image for projection onto a screen 62 by means of a suitable optical system which is symbolically represented as a converging lens 64. A further necessary component of the device 60 is an enclosure 66 which prevents ambient light from reaching the panel 12. In this embodiment, the light absorbing material 33 is replaced by a reflective surface or mirror 68, which increases the scattering of light toward the front of the panel 12. To minimize parallax image effects, the mirror 68 should be separated from the PDLC film 16 by a very thin transparent substrate layer 32, or entirely replace 32 and be in direct contact with the conductive layer 20, or be a metallic mirror and replace both 32 and 20 and be in direct contact with the PDLC layer 16. The display image source embodiment is especially suited for use in automotive heads-up display, which may include a holographic lens for reflecting an image of the liquid crystal display toward the vehicle operator.

Figure 3:
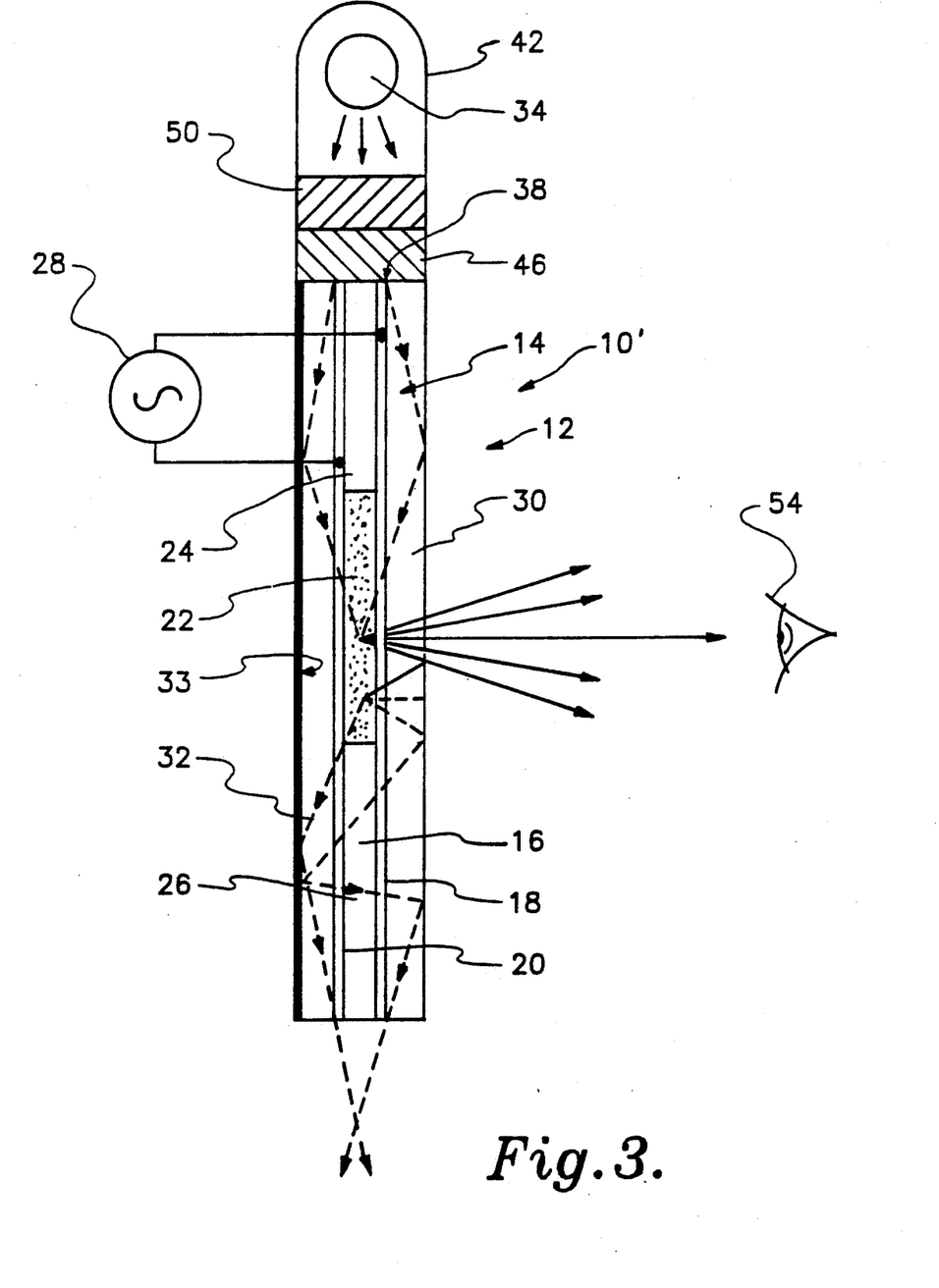
FIG. 3 is a diagram illustrating an edge-illuminated liquid crystal device of the present invention, in which the device acts as either a light pipe or a light-emitting panel.

A third liquid crystal device 10' embodying the present invention is illustrated in FIG. 3. This light-pipe/light panel device differs from the device 10 in that only one end is edge-illuminated. In the voltage off-state most of the light is emitted from the side of the panel and can be observed by a viewer, whereas in the voltage on-state much of the light is transmitted through the cell and is emitted at the edges of the cell, which are smooth, non-reflective, non-diffusing edges except for the illuminated edge. If only the light-panel effect is desired (which can have selected active or inactive segments as in the device 10) and edge emitted light is not desired, then black absorbers can be used at all the edges except for the illuminated one(s). The light-pipe/-light-panel device can be used with or without the rear light absorbing layer 33, and with or without a mirror 68, depending upon how the light panel effect is to be used.

Figure 4A:
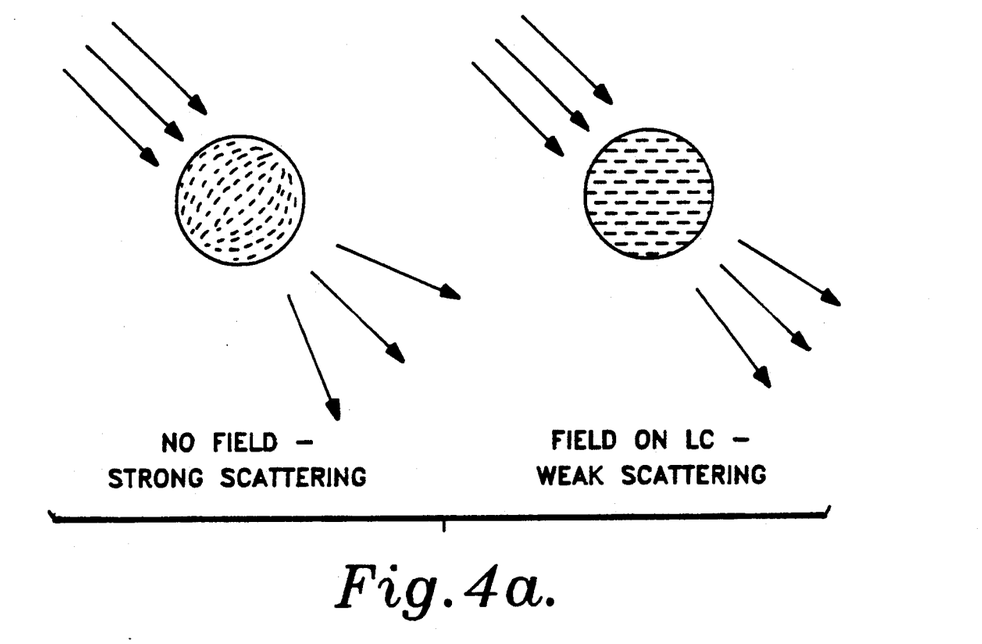
FIGS. 4a and 4b are diagrams illustrating light scattering effects in an edge-illuminated PDLC cell in which the LC droplets are in an isotropic polymer host and in an aligned LC-polymer host respectively.
Figure 4B:
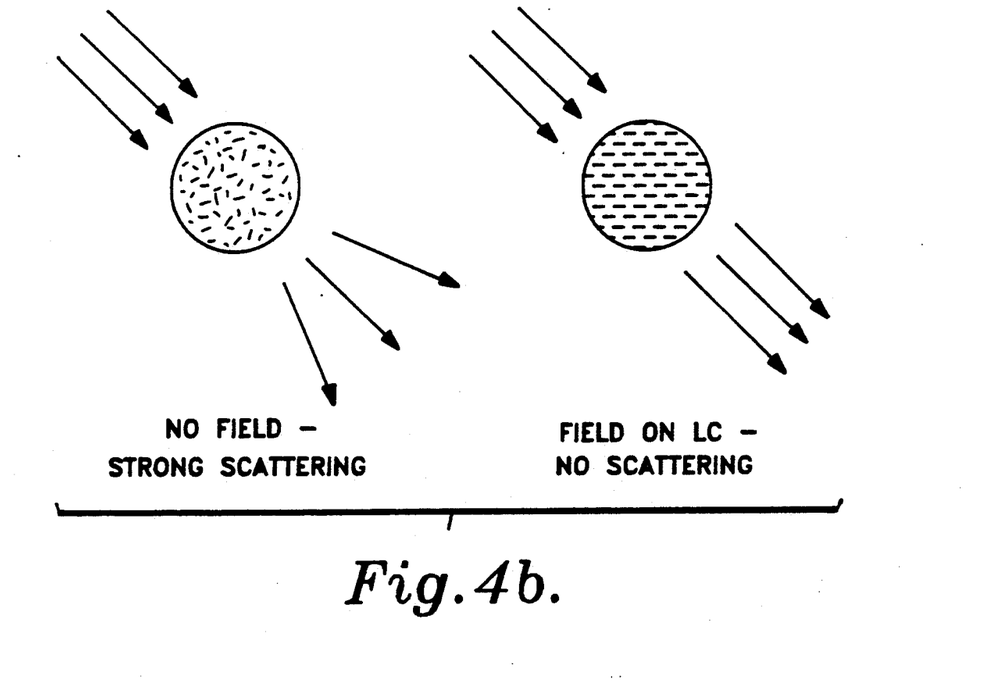

An even higher contrast edge-illuminated liquid crystal device embodying the present invention is illustrated in FIG. 4b, where an aligned liquid crystal polymer is used as the host matrix for LC droplets in a PDLC film instead of the usual isotropic polymer host illustrated in FIG. 4a. The LC-polymer is chosen to have approximately the same refractive indices ($n_0$ and $n_e$) as the LC droplets, and both are chosen to have the same sign of dielectric anistropy, which is illustrated as positive dielectric anistropy in FIG. 4b. The formation of LC droplets in a LC-polymer host was reported by H. Ringsdorf, H. W. Schmidt, and A. Schneller, in Makromol. Chem., Rapid Commun., 3, 745 (1982), however, they did not match the refractive indices of the LC and LC-polymer, and they did not align the LC-polymer. The LC polymer is uniformly aligned (in the field direction in FIG. 4b) by use of surface alignment, electric field or magnetic field alignment during its formation. Thus when the LC droplets in the resultant PDLC film are electrical field aligned, they match the refractive indices of the LC-polymer and show virtually no scattering. The configuration illustrated in FIG. 4b is also highly effective as a light-pipe/light-panel device.

EXAMPLE 1

A PDLC display cell of the type illustrated in FIG. 1 was fabricated. The cell was made from glass plates which were ¼ inch thick for the back plate and ⅛ inch thick for the front plate. The thicker back plate gave a better contrast display compared to using the ⅛ inch thick glass plates on both front and back. The PDLC film was made (between the ITO electrodes on the glass plates) by UV photopolymerization of a solution of 1:1 liquid crystal (BDH-E9) in thiol-ene monomer system. Specifically this monomer system was the optical cement Norland NOA65 containing 3% of the LC-monomer additive 4-butylphenly 4'-acryloyloxybenzoate. The glass electrodes were configured to give an overall display area of 2.25"×4", and the PDLC spacing was controlled by the use of 15 micrometer diameter glass beads dispersed in the solution prior to photopolymerization. The black absorbing surface was placed in direct contact with the back glass plate. The cell was illuminated with small fluorescent tube lights, placed above and below the PDLC cell, with a plastic diffuser film between the lights and the cell. No polarizers were used. Contrast ratios up to 28:1 were measured when viewing the light intensity difference between voltage-on and voltage-off segments in the display area.

EXAMPLE 2

The same cell and illumination system was used as in EXAMPLE 1 except that the diffusers of the top and bottom of the cell were replaced with polarizer films. Visual observations clearly showed that the contrast ratio of the display was improved when the polarizer film had its linear polarization direction perpendicular to the direction of the E-field when it is applied across the PDLC between the ITO electrodes. When the polarizer was aligned parallel with the E-field, the contrast was lowered when viewing normal to the cell, and was much lower when viewing at an angle from either side.

EXAMPLE 3

This example provides experimental evidence for modulation of the total light emitted from the viewing side of an edge-illuminated PDLC cell. The total light emitted (at all angles) from the front (viewing side) of an edge-illuminated PDLC cell was modulated by changing the E-field on the PDLC. The PDLC cell was made by UV polymerization of the components given in EXAMPLE 1, formed between ITO electrodes (unpatterned) on ⅛ inch thick glass plates. It was edge-illuminated from the top, with an incandescent lamp via a fiber optic bundle, with the beam normal to the top of the cell. The total light emitted from the front side was measured, under various conditions, using an integrating sphere detector placed at the front glass surface. Black tape was used to cover the back side in TABLE 1, and both the back side and bottom edge in TABLE 1. The polarizers were aligned with respect to the E-field direction which could be applied across the PDLC.

TABLE 1

Relative Integrated Light Intensity From Side of PDLC Cell, Top Edge Illuminated and Black Tape on Back Side

|  | No Diffuser | Diffuser | Perpendicular Polarizer | Parallel Polarizer |
|---|---|---|---|---|
| Off | .0211 | .0275 | .0192 | .0188 |
| On (100 V) | .0109 | .0124 | .0090 | .0107 |
| CR | 1.94 | 2.22 | 2.13 | 1.75 |

TABLE 2

Relative Integrated Light Intensity From Side of PDLC Cell, Top Edge Illuminated and Black Tape on Back Side and Bottom Edge

|  | No Diffuser | 24% ND | Perpendicular Polarizer | Parallel Polarizer |
|---|---|---|---|---|
| Off | .0574 | .0203 | .0245 | .0245 |
| On (100 V) | .0282 | .0098 | .0114 | .0140 |
| CR | 2.04 | 2.07 | 2.08 | 1.75 |

These results show that about twice as much light was emitted (at all angles) from the face of the edge-illuminated PDLC cell in the voltage off-state as compared to its on-state. This contrast ratio (CR) varied with illumination conditions, but was significantly larger for perpendicular-polarized light as compared to parallel-polarized light under the illumination conditions of these experiments.

EXAMPLE 4

Experimental evidence was obtained for E-field modulation of the total light transmitted from one edge to another in an edge-illuminated PDLC cell. The same PDLC cell was used as in EXAMPLE 3, but without any black tape, and the same illumination source was used, except that the incident light was at an angle of about 30° off normal to the edge. With illumination at the top of the cell, the exit light intensity (at all angles) was measured at the bottom of the cell with the integrated sphere detector. The results are shown in TABLE 3.

TABLE 3

Relative Integrated Light Intensity Exiting From Bottom of a PDLC Cell, Top Edge Illuminated, With No Absorbing Layers on the Sides

|  | No Diffuser | Diffuser | Perpendicular Polarizer | Parallel Polarizer |
|---|---|---|---|---|
| Off | .0544 | .0553 | .0547 | .0537 |
| On (100 V) | .0620 | .0635 | .0677 | .0546 |
| CR | 1.14 | 1.15 | 1.24 | 1.02 |

For this cell, under these illumination conditions, the on-state increased the intensity of the light transmitted through the cell as compared to the off-state. The modulated increase was about 15% for diffuse, unpolarized light, while the increase was about 24% when a perpendicular-aligned (versus the E-field) was placed on top of the cell.

While several illustrative embodiments of the invention have been shown and described, numerous variations and alternate embodiments will occur to those skilled in the art, without departing from the spirit and scope of the invention. For example, edge-illumination of the display panel may be achieved by the use of a fluorescent dye dispersed plastic sheet in combination with the optical lamps, although not shown in the drawings. Further, the scope of the invention includes application to types of liquid crystal displays other than PDLCs, such as dynamic scattering mode, and Nematic Curvilinear Aligned Phase (NCAP) displays. The display device may have picture elements in an arrangement other than segments, such as an active matrix display, and may include color elements or filters. Accordingly, it is intended that the present invention not be limited solely to the specifically described embodiments. Various modifications are contemplated and can be made without departing from the spirit and scope of the invention as defined by the appended claims.

We claim:

1. A liquid crystal display device, comprising:
   liquid crystal display panel means including:
      a polymer dispersed liquid crystal film having positive dielectric anisotropy liquid crystal;
      electrode layers formed on opposite surfaces of a predetermined area of the liquid crystal film for creating an electric field for switching the liquid crystal film in said predetermined area for viewing at normal incidence between a light transmissive state and a light scattering state in response to the presence or absence respectively of an applied electrical potential; and
      front and back transparent face plates which sandwich the liquid crystal film and electrode layers therebetween;
   light source disposed external of and adjacent to a light-receiving edge of the display panel means for illuminating the display panel means through said edge thereof, said light source comprising first and second optical lamps for illuminating the display panel means through said light receiving edge and an edge opposite to said light-receiving edge thereof respectively, and
   first and second light diffusing means disposed between the first and second optical lamps and said respective edges of the display panel means.

2. A display device as in claim 1, in which the light source illuminates the display panel means substantially perpendicular to said electric field.

3. A display device as in claim 1, in which the liquid crystal display panel has a first image area in which liquid crystal directors thereof are randomly aligned and which scatters light from the light source through the front face plate, and a second image area in which liquid crystal directors thereof are aligned by an applied electric field and which scatters substantially less light from the light source.

4. A display device as in claim 3, in which the display panel means further comprises light absorbing means provided at a surface of the rear face plate.

5. A display device as in claim 3, in which the display panel means further comprises light reflecting means provided at a surface of the rear face plate.

6. A display device as in claim 3, in which the polymer dispersed liquid crystal film comprises a liquid crystal polymer host matrix and liquid crystal droplets dispersed in the matrix, the matrix and droplets having positive dielectric anisotropy and approximately equal indices of refraction.

7. A liquid crystal display device, comprising:
   liquid crystal display panel means including:
      a polymer dispersed liquid crystal film having positive dielectric anisotropy liquid crystal;
      electrode layers formed on opposite surfaces of a predetermined area of the liquid crystal film for creating an electric field for switching the liquid crystal film in said predetermined area for viewing at normal incidence between a light transmissive state and a light scattering state in response to the presence or absence respectively of an applied electrical potential; and
      front and back transparent face plates which sandwich the liquid crystal film and electrode layers therebetween;
   light source disposed external of and adjacent to a light-receiving edge of the display panel means for illuminating the display panel means through said edge thereof;
   said light source comprising first and second optical lamps for illuminating the display panel means through said light receiving edge and an edge opposite to said light-receiving edge thereof respectively, and
   first and second light polarizing means disposed between the first and second optical lamps and said respective edges of the display panel means.

8. A liquid crystal display device, comprising:
   liquid crystal display panel means including a polymer dispersed liquid crystal cell having positive dielectric anisotropy;
   light source disposed external of and adjacent to a light-receiving edge of the display panel means for illuminating the display panel means through said edge thereof;
   electrode means for creating an electric field for switching a predetermined area of the liquid crystal cell for viewing at normal incidence between a light transmissive state and a light scattering state in response to the presence or absence respectively of an electrical potential applied across the electrode means;
   the light source illuminating the display panel means substantially perpendicular to said electric field; and
   light polarizing means disposed between the light source and said light-receiving edge of the display panel means for only passing light therethrough which has a polarization perpendicular to the direction of the electrical potential applied by the electrode means.

9. A display device as in claim 8, in which the liquid crystal cell comprises a liquid crystal polymer host matrix aligned with said electric field, and liquid crystal droplets dispersed in the matrix, the matrix and droplets having positive dielectric anisotropy and approximately equal indices of refraction.

* * * * *